United States Patent [19]

Onanian

[11] Patent Number: 4,568,148
[45] Date of Patent: Feb. 4, 1986

[54] HAND-HELD COLLAPSIBLE MICROSCOPE SYSTEM

[76] Inventor: Richard A. Onanian, 85 Irving St., Arlington, Mass. 02174

[21] Appl. No.: 548,244

[22] Filed: Nov. 3, 1983

[51] Int. Cl.[4] .................. G02B 27/02; G02B 27/04; G02B 7/04
[52] U.S. Cl. .................. 350/239; 350/250; 350/255
[58] Field of Search ............ 350/507, 529, 534–536, 350/546, 145, 250, 140, 431, 238–239, 255; 40/362–367; 356/244

[56] References Cited

U.S. PATENT DOCUMENTS

| | | | |
|---|---|---|---|
| 1,876,176 | 9/1932 | Sulzner | 350/529 |
| 2,188,813 | 1/1940 | King | 40/363 |
| 2,235,310 | 3/1941 | Bausch | 350/535 |
| 2,312,488 | 3/1943 | Rowland | 356/244 |
| 2,351,932 | 6/1944 | Deckel et al. | 350/407 |
| 2,384,259 | 9/1945 | Quinby | 350/315 |
| 2,435,074 | 1/1948 | Fry | 350/315 |
| 2,789,460 | 4/1957 | Kaufman | 350/140 |
| 3,094,781 | 6/1963 | Vangor | 350/239 |
| 3,169,332 | 2/1965 | Rosenburgh | 40/364 |
| 3,410,634 | 11/1968 | Buckner | 350/239 |
| 3,562,939 | 2/1971 | Jacobs, Jr. et al. | 40/365 |
| 3,649,100 | 3/1972 | Kirst | 350/536 |
| 3,802,102 | 4/1974 | Licciardi | 40/367 |
| 4,013,347 | 3/1977 | Nakamura | 350/431 |
| 4,299,440 | 11/1981 | Hodgson | 350/529 |
| 4,357,073 | 11/1982 | Carver | 350/140 |

FOREIGN PATENT DOCUMENTS

| | | | |
|---|---|---|---|
| 884432 | 10/1971 | Canada | 350/250 |
| 561426 | 10/1923 | France | 356/244 |
| 1098179 | 7/1955 | France | 350/238 |
| 155963 | 1/1963 | U.S.S.R. | 350/576 |

OTHER PUBLICATIONS

Souvaniemi, O., WO82/00358, "Method of Measurement and a Cuvette," 2-1982.

Primary Examiner—William H. Punter
Attorney, Agent, or Firm—Joseph S. Iandiorio; William E. Noonan

[57] ABSTRACT

A hand-held collapsible microscope system has a lens section for holding a lens and a stage section for holding a specimen to be viewed; a lens in the lens section and a stage hole in the stage section are aligned with each other when the system is erected, and the stage section holds a specimen in registration with the stage hole. First and second resilient pleated sections interconnect the longitudinal edges of the lens section with the corresponding longitudinal edges of the stage section for enabling the sections to be erected with the lens and stage hole aligned and the distance between them to be adjustable for focussing by gentle finger pressure squeezing the lens section toward the stage section, and for enabling the sections to be swung to the collapsed position with the pleats extended and the sections flat on one another. A blank for making the microscope system is also disclosed.

43 Claims, 29 Drawing Figures

HAND-HELD COLLAPSIBLE MICROSCOPE SYSTEM

FIELD OF INVENTION

A hand-held collapsible microscope system, and more particularly such a system made from a single blank of paper, plastic or the like.

BACKGROUND OF INVENTION

Even so-called inexpensive, portable microscopes are relatively expensive and bulky. Those microscopes considered to be in the less expensive range are often of lower power and omit many of the features which are found in better instruments. Focussing usually requires a special mechanism; a source of light is generally required, and the devices tend to be fragile. In addition, such devices often require specially sized and shaped slides and have no provision for carrying spare slides or optical elements for use with the microscope.

SUMMARY OF INVENTION

It is therefore an object of this invention to provide an inproved, simple, inexpensive microscope with high-level resolution.

It is a further object of this invention to provide such a microscope which can be built simply, quickly and easily from a single blank of paper, plastic or the like.

It is a further object of this invention to provide such a microscope which is light, portable and can be collapsed flat, no thicker than several sheets of heavy paper and no larger than a shirt pocket.

It is a further object of this invention to provide such a microscope which is not fragile.

It is a further object of this invention to provide such a microscope which is capable of high quality resolution.

It is a further object of this invention to provide such a microscope which operates with available ambient, natural or artificial light sources.

It is a further object of this invention to provide such a microscope which uses a simple, easy, focussing technique.

It is a further object of this invention to provide such a microscope which uses conventional micro slides.

It is a further object of this invention to provide such a microscope which includes added features such as single and double element polarizers, encapsulators, reticles, variable apertures, color filters, diffusers and highlighters.

It is a further object of this invention to provide such a microscope which provides storage for numerous slides and other optical elements.

It is a further object of this invention to provide such a microscope which permits examination of opaque/-semi-opaque as well as translucent specimens.

It is a further object of this invention to provide such a microscope which permits examination of liquid specimens in vertical orientation.

It is a further object of this invention to provide such a microscope which does not require the reflection of light by means of a mirror.

The invention features a hand-held collapsible microscope system including a lens section for holding a lens and a stage section for holding a specimen to be viewed. There is a lens in the lens section and a stage hole in the stage section aligned with the lens when the sytem is erected. Means in the stage section hold the specimen in registration with the stage hole. First and second resilient pleated sections interconnect the longitudinal edges of the lens section with the corresponding longitudinal edges of the stage section for enabling the sections to be erected with the lens and stage hole aligned and the distance between them to be adjustable for focussing by gentle squeezing with finger pressure against the pleats and for enabling the sections to be swung to the collapsed position with the pleats extended and the sections flat on one another.

In a preferred embodiment the means for holding a specimen includes a pair of slots in the stage section and spaced on either side of the stage hole for longitudinally holding a slide over the stage hole for viewing and storage. The means for holding may also include a channel extending laterally across the stage section for holding a slide tab over the stage hole. The channel may be on the inside or the outside of the stage section. The channel surrounds and covers the area of the stage hole and includes an aperture aligned with the stage hole. The channel may include a channel plate fastened to the stage section along two lateral paths, leaving a covered tab channel between the fastened paths and between the channel plate and the stage section.

A gap may be provided in either one or two of the pleats between the lens and stage sections for enabling direct interior viewing of the stage hole when the lens section is swung or retracted toward the collapsed condition. The channel may be formed out of the same material creating the gap. Each pleat includes at least one pair of spaced lateral slots for storing a tab. The tabs include a specimen tab for holding a specimen to be viewed which may include two transparent sheets hingedly connected along one edge. The tabs also include a grid tab having a measured grid for indicating the dimensions of a specimen being viewed. The specimen to be viewed may be carried in the grid tab or in a specimen slide used in conjunction with the grid tab. An aperture tab may be provided having at least one hole in it for reducing the optical aperture of the stage hole. There may also be included a polarizer tab which may be used in conjuction with a polarizing lens disc for polarizing light illuminating a specimen through the stage hole, and a diffuser tab for diffusing the light illuminating a specimen through the stage hole. The diffuser tab may include a hole for passing undiffused light to highlight a smaller area of the specimen than illuminated through the stage hole.

The slides may include a standard size slide having first and second transparent sheets hingeably connected along one edge, and a well slide including a funneled hole nestable with the stage hole for holding a liquid specimen to be viewed.

There may be at least one pocket provided in one of the lens and stage sections for storing a tab. The lens section may be formed of two overlapping plates, which form such a pocket between them. Each of the plates contains a lens hole, and the lens is fastened and encapsulated over the lens holes between the plates.

A polarizing wheel having a polarizing element at its center aligned with the lens may be provided rotatable about the axis of the lens for varying the direction of polarization. Alternatively, a first polarizing wheel having a first polarizing arcuate segment may be provided with the wheel being rotatably mounted to the lens section to move the segment past the lens and vary the degree of angularity between the polarizing axes of the polarizing wheel and the polarizing tab. That polarizing wheel may also include, at the same radius as the segment, a hole for unpolarized viewing. A color wheel may be provided rotatable about an axis spaced from the axis of the lens and including at least one color filter radially spaced from the rotation axis of the color wheel for aligning with the lens in one rotated position of the color wheel. There may also be provided an aperture wheel, rotatable about an axis spaced from the axis of the lens and including at least one aperture smaller than that of the lens aperture and radially spaced from the rotation axis of the aperture wheel, for aligning with the lens in one rotated position of the aperture wheel. A second polarizing wheel, having a second polarizing arcuate segment and being rotatably mounted to the lens section, may be provided to move the second segment past the lens and the first segment of the first polarizing wheel to vary polarization over 180°. The invention also features a blank for forming a hand-held collapsible microscope, including a stage section, first and second pleated sections, and a lens section with top and bottom plates. The first pleated section is connected with the top plate along a first fold line and with the stage section along a second fold line. The first pleated section includes a third fold line intermediate the first and second fold lines. The second pleated section is connected with the stage section along a fourth fold line, and with the bottom plate along a fifth fold line. The second pleated section includes a sixth fold line intermediate the fourth and fifth fold lines. The top and bottom plates include corresponding lens holes for accomodating a lens. The stage section includes a stage hole corresponding to the lens holes and a pair of slots in the stage section transverse to the fold lines and spaced on either side of the stage hole for receiving a slide.

At least one of the plates in the blank may include a depressed area surrounding its lens hole for receiving the lens. There may also be included a generally U-shaped channel plate transversely cut in the first pleated section proximate the stage hole with the two ends of the arms of the U-shaped channel plate swingably connected along the second fold line for enabling the channel plate to be folded over the stage section in the area of the stage hole. The channel plate has a hole corresponding with the stage hole in the corresponding folded position.

A pair of wheel slots may be provided along the first and fifth fold lines proximate the lens holes for receiving a rotatable wheel. At least one of the wheel slots may be crescent shaped. There may be two pairs of such wheel slots along the first and fifth fold lines on either side of the lens holes for mounting first and second wheels which overlap each other and the lens holes.

The blank may also include at least one U-shaped recess at one end of one of the top and bottom plates for forming a storage site for slide tabs between the plates. There may also be at least one pair of spaced transverse slots in the pleated section for forming a storage site for slide tabs.

DISCLOSURE OF PREFERRED EMBODIMENT

Other objects, features and advantages will occur from the following description of a preferred embodiment and the accompanying drawings, in which.

Figure 1:
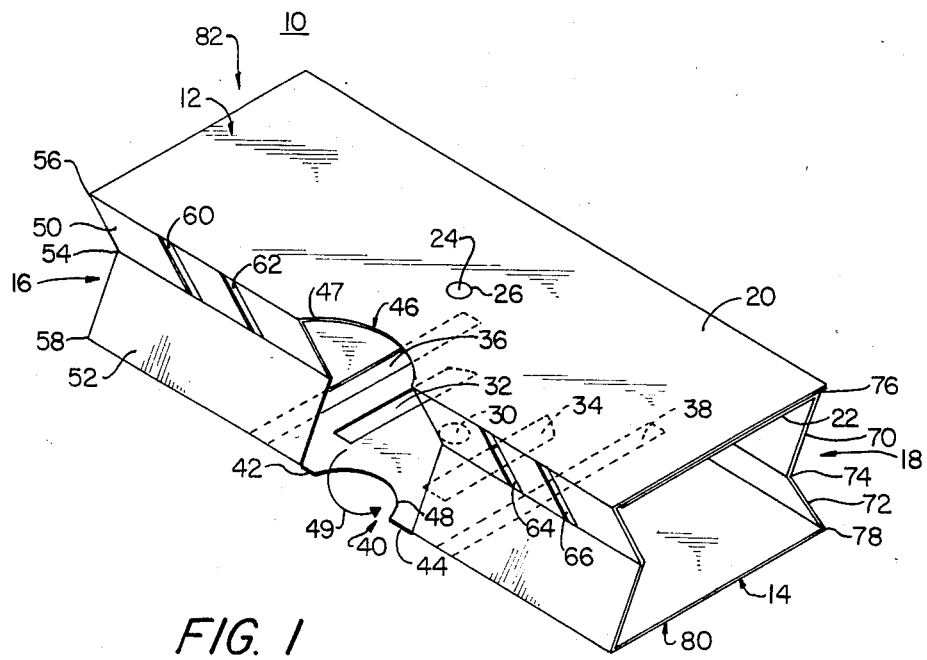
FIG. 1 is an axonometric view of a hand-held collapsible microscope system according to this invention.
Figure 2:
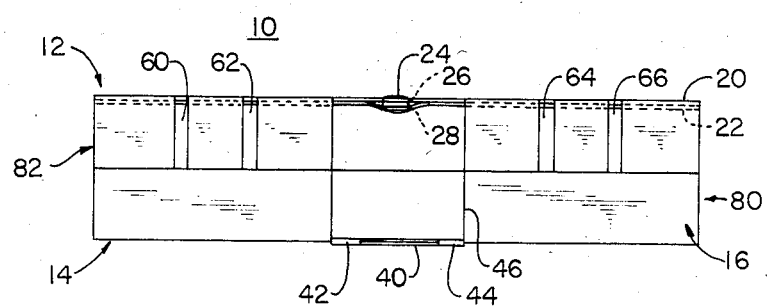
FIG. 2 is a front elevational view of the microscope system of FIG. 1.

There is shown in FIG. 1 a hand-held collapsible microscope system 10 according to this invention including a lens section 12 and a stage section 14 interconnected by pleats 16 and 18. Lens section 12 is formed of top plate 20 and bottom plate 22, between which is sandwiched lens 24 visible in hole 26 in top plate 20. Lens 24 registers with a similar hole 28, FIG. 2, in bottom plate 22.

Stage section 14, FIG. 1, includes stage hole 30 with channel plate mounting slots 32 and 34 on either side. Also contained in stage section 14 are slide retaining or mounting slots 36 and 38. Slots 36 and 38 are shown more clearly in FIG. 5, along with channel piece 40, only the hinged ends of which, 42 and 44, visible through slots 32 and 34, are visible in FIG. 1. Channel piece 40 is formed by the piece which is removed from pleat 16 to form cutout or recess 46, FIG. 1. Recess 46 may include recess 47 in lens section 12 and recess 48 in stage section 14. Recess 46 also includes a gap in pleat 16 between lens section 12 and stage section 14 which enables direct interior viewing of stage hole 30 when lens section 12 is swung toward the collapsed condition as described below. Channel plate 40 is rotated out of recess 46 and fastened to the bottom of stage section 14, as indicated by arrow 49.

Figure 6:
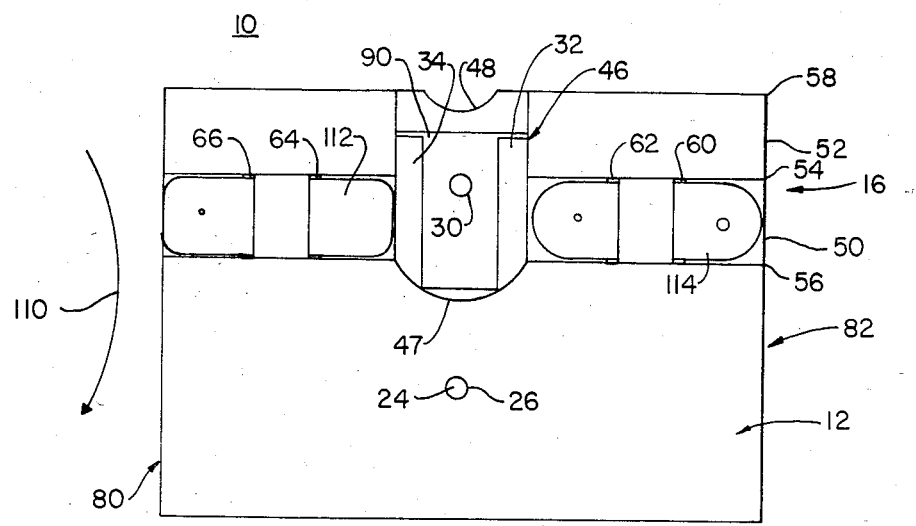
FIG. 6 is a top view of the microscope system of FIG. 1 in a collapsed condition.
Figure 6A:
FIG. 6A is a front view of the microscope system as shown in FIG. 6.

Pleat 16 includes two longitudinal elements 50, 52, interconected with each other at fold line 54 and with lens section 12 and stage section 14 by means of fold lines 56 and 58, respectively. Element 50 may include two pairs of spaced slots 60, 62 and 64, 66, each of which can be used to store a slide tab as shown in FIG. 6. Pleat 18 is similarly formed of two elements 70, 72, joined together at fold line 74 and joined to lens section 12 and stage section 14 at fold lines 76, 78, respectively. Slots such as 60, 62 and 64, 66, for storing slide tabs, may be provided in element 70, 72 or element 52, as well as in element 50. Both ends 80, 82 of microscope 10 are open.

Figure 3:
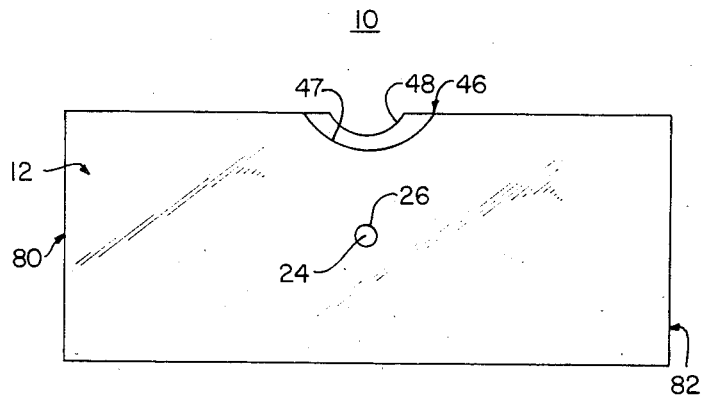
FIG. 3 is a top view of the microscope system of FIG. 1.
Figure 4:
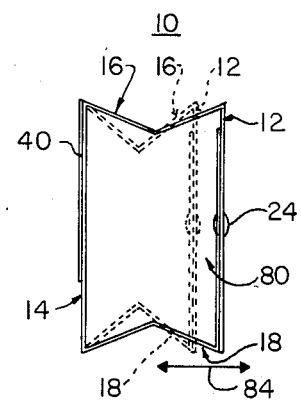
FIG. 4 is an end view of the microscope system of FIG. 1.

The user holds microscope system 10 as shown in FIG. 3 with a thumb on top of lens section 12 and the index finger on the bottom of stage section 14, and moves his eye close to lens 24 to view into the microscope. Focussing is accomplished by squeezing the thumb and index finger together to collapse pleats 16 and 18 and adjust the focal length with motion as indicated by arrow 84, FIG. 4, and indicated by the phantom position of microscope 10.

Figure 5:
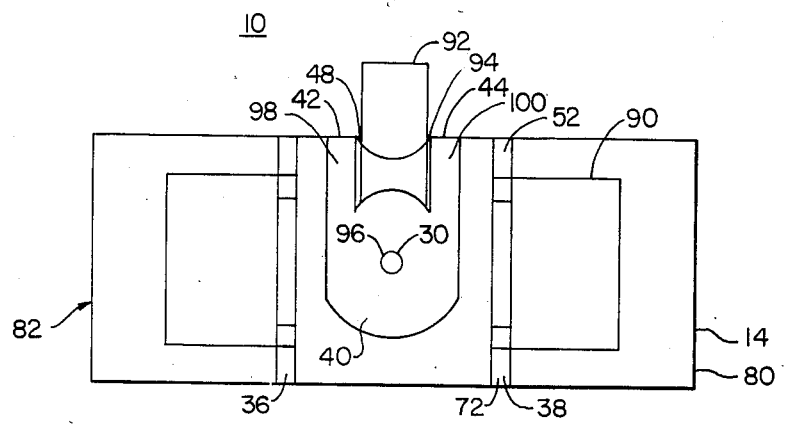
FIG. 5 is a bottom view of the microscope system of FIG. 1.

A slide 90, FIG. 5, is mounted in microscope system 10 by sliding it through slots 36 and 38 so that the ends of slide 90 are outside of stage section 14 but the middle of slide 90 is inside of stage 14 and is in between stage hole 30 and lens 24.

For certain applications, a micro slide may be inserted in a reverse manner such that the ends of slide 90 are inside of stage section 14 and the middle of slide 90 is outside of stage 14. A specimen slide tab 92, which is much smaller than conventional slide 90 and performs a similar function, is shown partially inserted in channel 94 formed by channel plate 40, which includes a hole 96 coincident with and on top of stage hole 30, and a pair of arms 98, 100, which end in hinges 42 and 44, respectively, that are attached at fold line 58 to stage section 14. The general U-shaped configuration of channel plate 40 is attached to the bottom of stage section 14 by applying a piece of adhesive material, such as tape, over each slot 32, 34, FIG. 1, so that the adhesive side of the tape is pushed through slots 32 and 34 in FIG. 1 and attached to the back side of arms 98 and 100, as shown in FIG. 5. This produces a passage between channel plate 40 and stage section 14, and between arms 98 and 100 for receiving slide tab. The tape is not shown.

Occasionally, when it is necessary to view slide 90 directly through stage hole 30 without viewing through lens 24, as when centering a specimen over stage hole 30 or positioning a specific portion of a specimen over stage hole 30, the microscope in FIG. 3, may be rotated as shown in FIG. 6 so that lens section 12 is moved in the direction of arrow 110 toward the collapsed position with pleats 16 and 18 extended toward the collapsed position. Then recess 46 is retracted from stage hole 30 to permit direct viewing of slide 90 for alignment, registration or any other purpose. FIG. 6 also shows two different slide tabs 112, 114 stored in slots 66, 64 and 62, 60.

Figure 7:
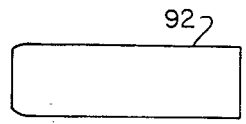
FIG. 7 is a top view of a hinged slide tab according to this invention.
Figure 9:
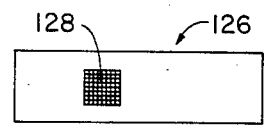
FIG. 9 is a top view of a hinged slide tab with a measured grid according to this invention.
Figure 8:
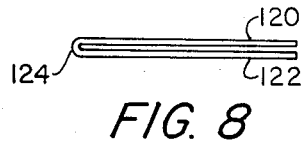
FIG. 8 is a side view of the slide tab of FIG. 7.
Figure 10:
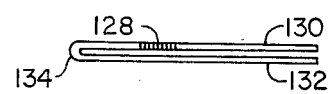
FIG. 10 is a side view of the hinged slide tab of FIG. 9.
Figure 11:
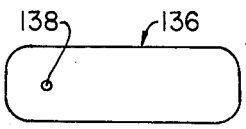
FIG. 11 is a top view of a diffusing slide tab according to this invention.
Figure 12:
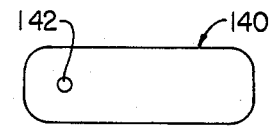
FIG. 12 is a top view of an aperture plate with a single aperture according to this invention.
Figure 13:
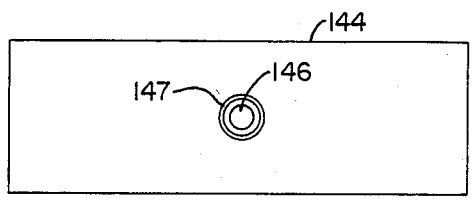
FIG. 13 is a top view of a well slide according to this invention.
Figure 13A:
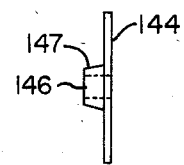
FIG. 13A is a side view of the well slide of FIG. 13.
Figure 14:
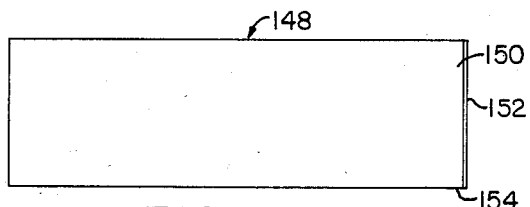
FIG. 14 is a top view of a hinged slide according to this invention.
Figure 14A:
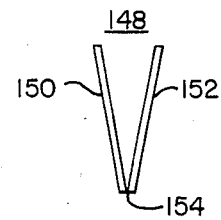
FIG. 14A is a side view of the hinged slide of FIG. 14.

Slide tab 92 may be a transparent device, FIG. 7, formed of two transparent sheets 120 and 122, FIG. 8, hingeably connected at 124 so that a specimen can be placed between them. Alternatively, a grid slide tab 126, FIG. 9, may include a measured grid 128, for determining the dimensions of specimens held by tab 126. Tab 126 may include a pair of transparent sheets 130 and 132, FIG. 10, hingeably connected at 134 similar to the construction of tab 92 shown in FIG. 8. Grid 128 may be integrally formed in sheet 130 or applied to the surface. Any of the specimen tabs of this invention may be aperture tabs, e.g., may include one or more apertures, such as shown in tabs 112, 114, FIG. 6, for reducing the optical aperture of stage hole 30. Although thus far slide 90 and slide tab 92 have been shown as devices for carrying specimens, this is not a necessary limitation as other tabs may also be used as optical elements, for example, as shown in FIG. 11, where tab 136 is a diffuser tab which may be used to diffuse extremely bright light that might make it difficult to see the specimen. Tab 136 may include a small hole 138 which may be used to let through a small portion of the brighter light to highlight certain portions of the specimen. A polarizing tab 137 illustrates a polarizing element which can be used to control the direction of polarization of the light directed to the specimen. Slide tab 140, FIG. 12, may be made opaque with a small aperture 142 that can be used to reduce the aperture provided by stage hole 30. Slide 90 may take the form of a funnel or well slide 144, FIG. 13, which has a small hole 146 and a funnel extension 147, FIG. 13A, that nests into stage hole 30 and that can retain a liquid specimen through the effects of surface tension. Slide 148, FIG. 14, may be formed of two transparent sections 150, 152, swingably connected together at hinge 154, FIG. 14A.

Figure 15:
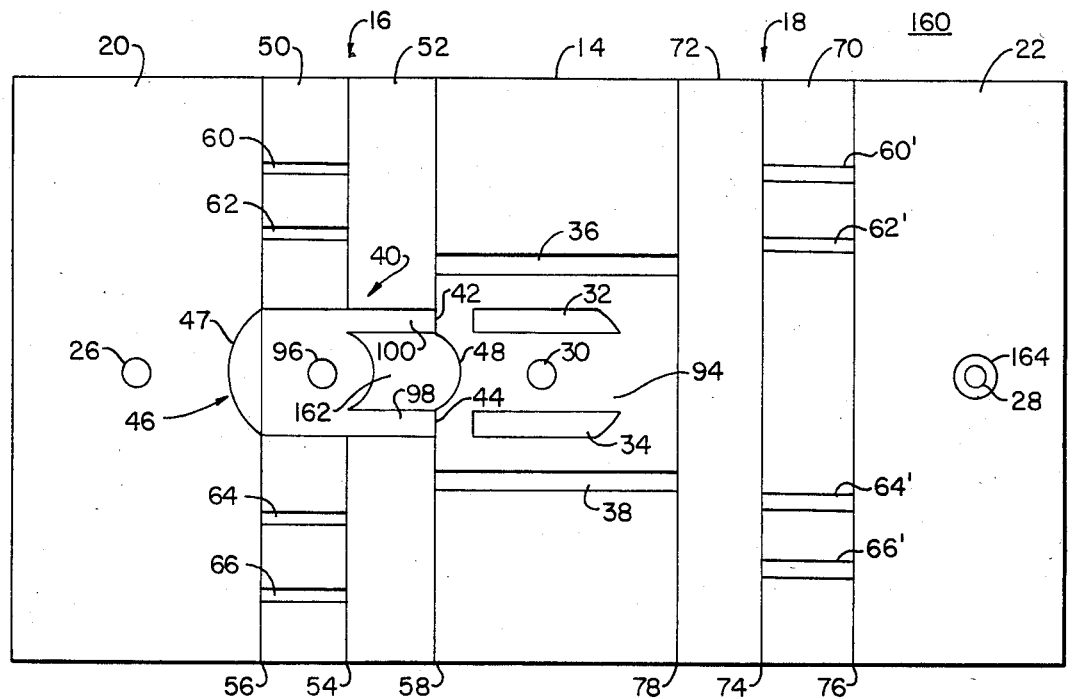
FIG. 15 is a plan view of a blank for making the microscope system of FIG. 1.

In accordance with this invention, microscope system 10 is formed from a simple flat blank 160, FIG. 15, made of paper-based material, plastic, or similar foldable material, such as cardboard, rubber, or fiber. Blank 160 is formed by scoring and stamping out specific sections and holes. Score line or fold line 56 delineates plate 20 of lens section 12 and together with score line 54 defines one element 50 of pleat 16. Score lines 54 and 58 define the other element 52 of pleat 16. Between score lines 58 and 78 is defined stage section 14. Score line 78, in conjunction with score lines 74 and 76, define elements 72 and 70 of pleat 18 and ultimately define plate 22. Lens holes 26 and 28 are stamped out, and around lens hole 28 a depression 164 may be formed to firmly seat and properly register a lens. Stage hole 30 is punched out, as is aperture 96 in channel 40, which aligns with stage hole 30 when channel plate 40 is folded over in final position. Slots 36 and 38 are cut for receiving a slide and slots 32 and 34 are cut to enable an adhesive material such as tape on the reverse side of blank 160 to extend through and contact the front surface of arms 98 and 100 of U-shaped channel plate 40 when it is swung into place with arms 100 and 98 covering slots 32 and 34, respectively. When channel plate 40 is cut and thus swung into position, it leaves recess 46, including segments 47 and 48, in the center of pleat 16. Area 162 is removed from channel plate 40 to provide easy access to and gripping of a slide tab in channel 94. Transverse pairs of slots 60, 62 and 64, 66 are provided in pleat 16 and similar slots 60', 62' and 64', 66' are provided in pleat 18 for storing tabs as previously described.

Figure 16:
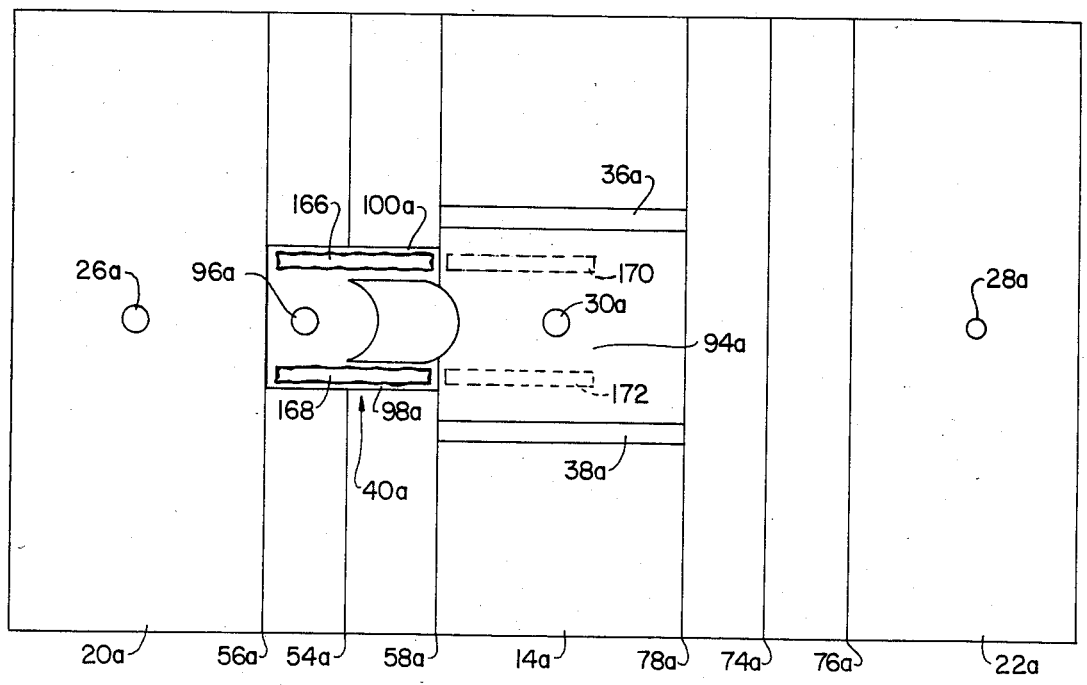
FIG. 16 is a plan view of an another blank which can be used to make a microscope system according to this invention.

In an alternative embodiment, as shown in blank 160a, FIG. 16, slots 32 and 34 may be eliminated and channel piece 40a may be attached to stage section 14a by means of a narrow bead of glue 166, 168 deposited on arms 100a and 98a of U-shaped channel member 40a. When channel member 40a is then swung over, the glue 166, 168 contacts the areas 170, 172 on either side of stage hole 30a to fasten channel plate 40a in place and create channel 94a.

In blank 160a, recess 47 of blank 160 has been eliminated. In blank 160a and blank 160b shown in FIG. 17A, the channel plate is rotated to the inner surface of stage section 14b as opposed to the construction with blank 160, FIG. 15, where channel plate 40 is fastened to the outside of stage section 14 in microscope system 10, FIG. 1.

Figure 11A:
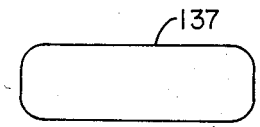
FIG. 11A is a top view of a polarizing slide tab according to this invention.
Figure 17A:
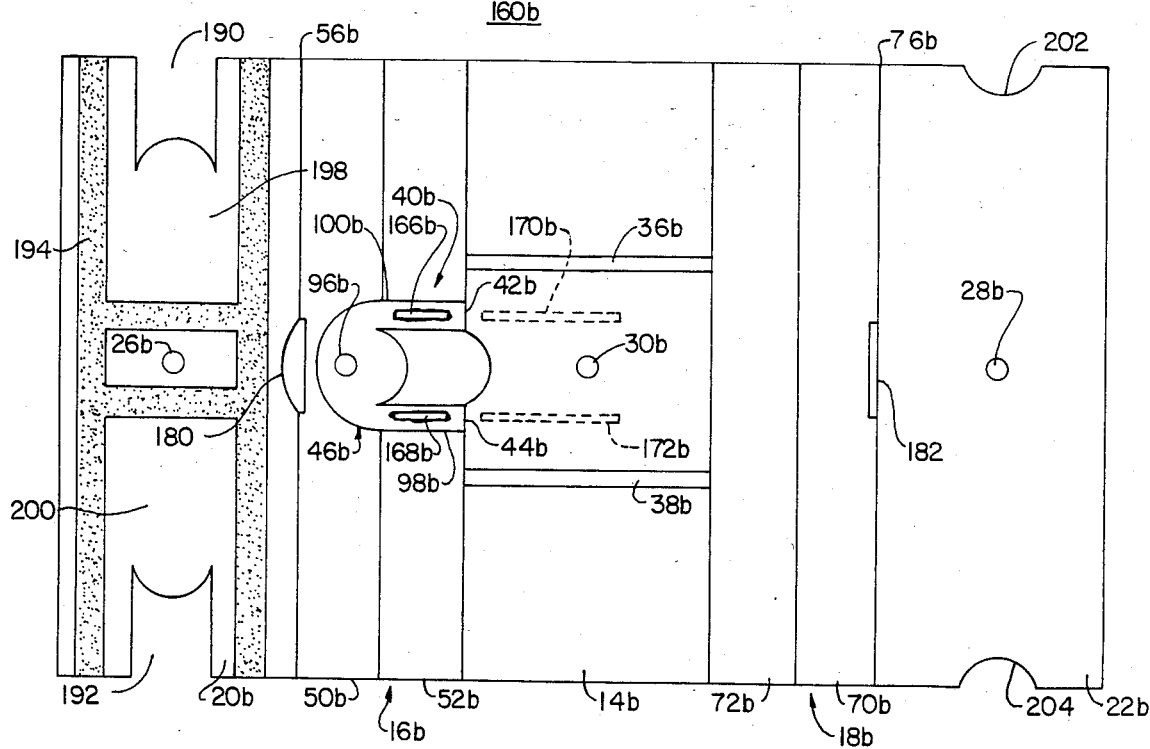
FIG. 17A is a plan view of yet another blank which can be used to make another microscope system according to this invention.
Figure 17B:
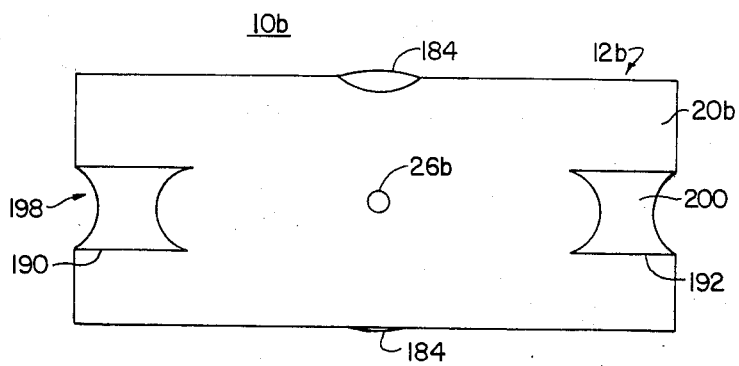
FIG. 17B is a top plan view of a microscope made with the blank of FIG. 17A.
Figure 18:
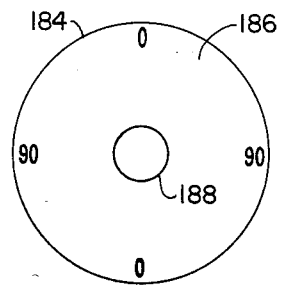
FIG. 18 is a polarizing wheel which may be used with the microscope system formed from the blank of FIG. 17.

Blank 160b, FIG. 17A, also uses a shorter channel plate 40b, which results from a reduced recess 46b in which recess 47 has been eliminated. Since recess 46b no longer reaches fold line or score line 56b, FIG. 17A, there is available space to provide a slot 180, which may be crescent-shaped, disposed along score 56b, and a corresponding slot 182, which may be crescent-shaped, along score 76b. These two slots provide a mounting for a rotatable wheel 184, FIG. 17B, when blank 160b has been assembled to form microscope 10b. One example of wheel 184 is shown in FIG. 18, where it takes the form of a disk 186 with a polarizing element 188 mounted at its center so that when installed in the position shown in FIG. 17B and rotated by the thumb and forefinger, the polarizing plane viewed through hole 26b may be varied from zero to 360°. If used with a polarizing tab such as shown in FIG. 11A, 360° control over the angularity of their polarizing axes can be effected.

Blank 160b also includes two U-shaped cutouts 190, 192, in plate 20b, which when surrounded with an adhesive 194 and closed down on plate 22b, define pockets 198, 200, for storing slide tabs. Recesses 202, 204, may be provided in plate 22b to increase ease of access and gripping of slide tabs stored in pockets 198 and 200.

Although only one rotatable wheel is provided for in blank 160b, FIG. 17A, that is not a necessary limitation. For example, blank 160c, FIG. 19A, includes two slots 182c and 182cc on score line 76c, and two slots 180c and 180cc along score line 56c, which slots may be partially crescent-shaped for ease of visibility of markings or graduations that may be contained on the periphery of the wheels and for easier manipulation of either one or both wheels mounted therein and rotatable about an axis spaced from the axis of lens 24 in hole 26. Polarizing wheel 220, FIG. 20, which may be used in either the pair of slots 180c, 182c or 180cc or 182cc, includes an arcuate polarizing segment 222 mounted on disk 224. A hole 223 may be provided for unpolarized viewing. If the disk is rotated the angle of the polarization is varied.

Figure 21:
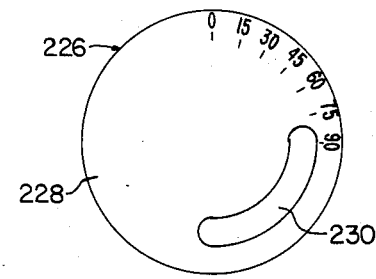
FIG. 21 is a complementary polarizing wheel to be used in combination with the polarizing wheel of FIG. 20 in a microscope system formed from the blank of FIG. 19 to provide a full 180° polarization variation.
Figure 22:
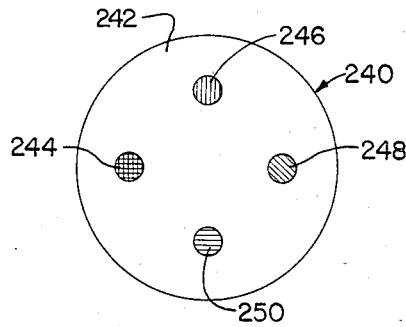
FIG. 22 is a color wheel including a number of different color filters which may be used with the microscope system formed from the blank of FIG. 19.
Figure 23:
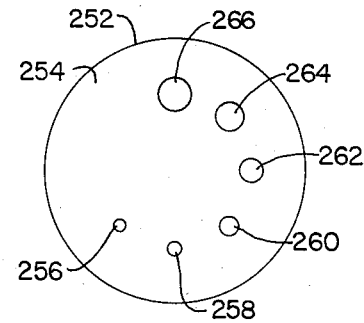
FIG. 23 is an aperture wheel having a number of apertures which can be used with the microscope system formed from the blank of FIG. 19.

If two such polarizing wheels are used, such as polarizing wheel 220 and a mirror-image wheel 226, FIG. 21, also formed from a disk 228 with an arcuate segment 230, an increased range of polarization control over 180° is achieved. Instead of one or both of the polarizing wheels, slots 180c, 182c, or 180cc, 182cc, may instead receive a color wheel 240, FIG. 22, including a disk 242 having one or more color filters 244, 246, 248 and 250, which, like the polarizing arcuate segments 222 and 230, may be placed in front of lens 24 in one of the rotated position to provide selected color filtration. Aperture wheel 252, FIG. 23, including disk 254 on which are located a number of different diameter apertures 256, 258, 260, 262, 264, and 266, may be mounted and rotated in a similar fashion to provide various apertures at lens 24.

Figure 19A:
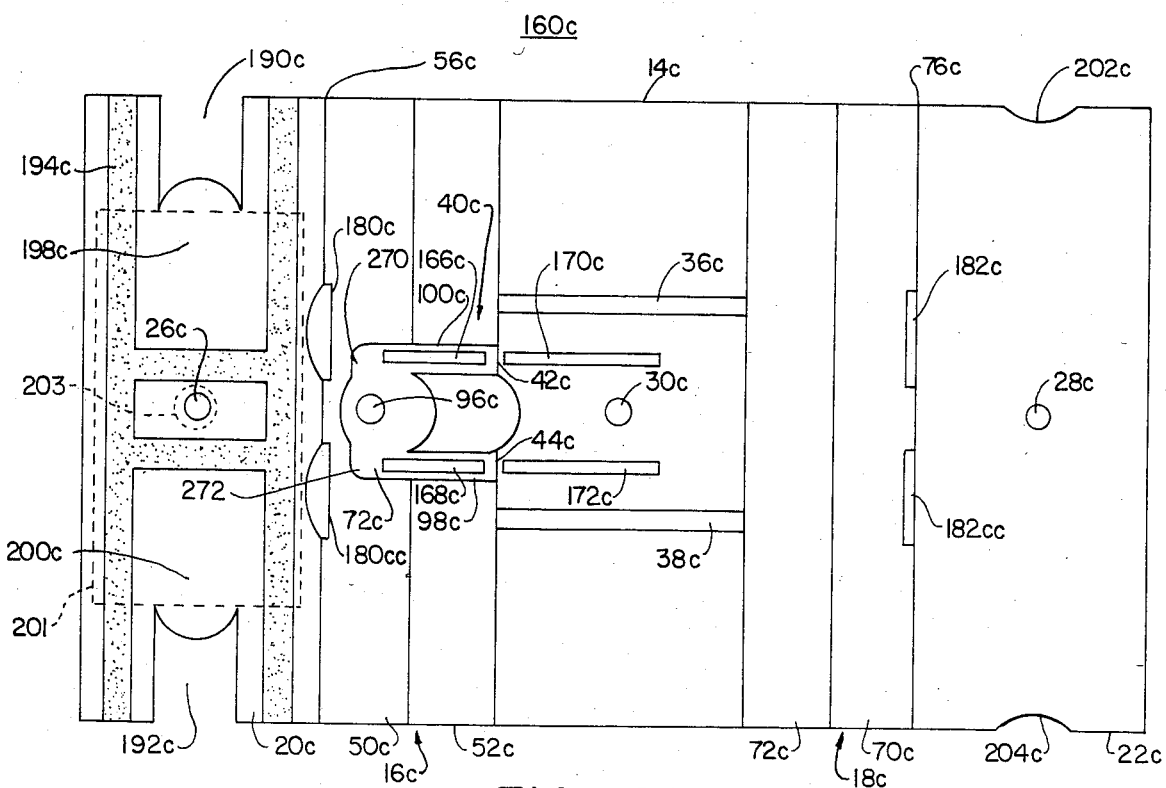
FIG. 19A is a plan view of yet another blank which can be used to form another microscope system according to this invention.
Figure 19B:
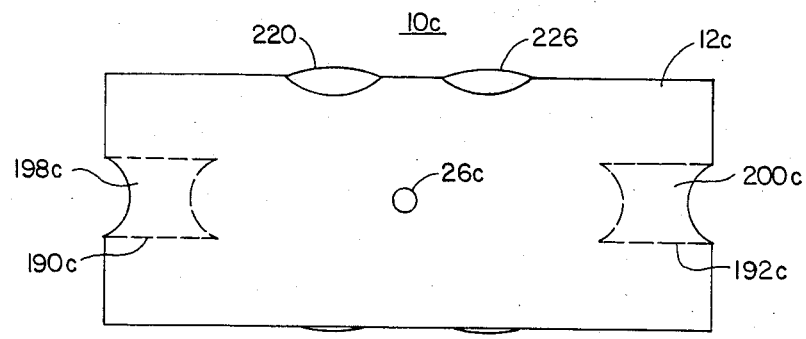
FIG. 19B is a top plan view of a microscope made with the blank of FIG. 19A.
Figure 20:
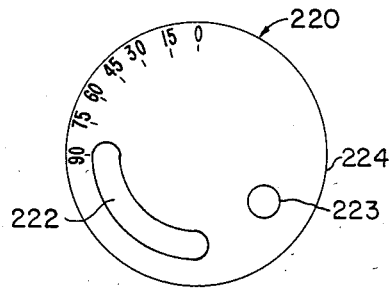
FIG. 20 is a plan view of a polarizing wheel with an arcuate polarizing segment that can be used to provide polarization of the viewed specimen in the microscope formed from the blank of FIG. 19.

A microscope system 10c, FIG. 19B, made with blank 160c of FIG. 19A, is shown with two polarizing wheels 220 and 226 installed. Microscope 10c also includes pockets 198c and 200c in lens section 12c, as explained with reference to FIG. 17A. In blank 160c, channel 40c has also been changed somewhat to provide enlarged shoulders 270 and 272, to increase the strength and rigidity of channel member 40c.

In some cases where more light is desired to illuminate the top surface of a specimen, a reflector surface 201, FIG. 19A, such as chromium plated Mylar tape, may be adhered to the underside of top plate 20c. Surface 201 contains a clearance hole 203 to accommodate lens hole 26. Light entering through slots 36c and 38c strikes surface 201 and is reflected to the top of the specimen at stage section 14c.

Other embodiments will occur to those skilled in the art and are within the following claims:

What is claimed is:

1. A hand-held collapsible microscope system comprising:
    a lens section for holding a lens;
    a stage section for holding a specimen to be viewed;
    a lens in said lens section and a stage hole in said stage section aligned with said lens when said system is erected;
    means in said stage section for holding a specimen in registration with said stage hole including a pair of lateral slots in said stage section and spaced on either side of said stage hole for longitudinally holding a slide over said stage hole for viewing and storage and a channel extending laterally across the outside of said stage section for holding a slide tab over said stage hole; and
    first and second resilient pleated sections interconnecting the longitudinal edges of said lens section with the corresponding longitudinal edges of said stage section for enabling the sections to be erected with said lens and stage hole aligned and the distance between them to be adjustable for focussing by gentle finger pressure on said pleat.

2. The microscope system of claim 1 in which said pleats enable said sections to be swung to the collapsed position with the pleats extended in an open condition and the sections flat on one another.

3. The microscope system of claim 1 in which said channel is on the inside of said stage section.

4. The microscope system of claim 1 in which said channel surrounds and covers the area of said stage hole and includes an aperture aligned with said stage hole.

5. The microscope system of claim 4 in which said channel includes a channel plate fastened internally along two lateral paths to said stage section leaving a covered tab channel between said paths and between said channel plate and said stage section.

6. The microscope system of claim 4 in which said channel includes a channel plate fastened externally through two lateral cutouts to said stage section leaving a covered tab channel between said paths and between said channel plate and said stage section.

7. The microscope system of claim 1 in which each pleat includes at least one pair of spaced lateral slots for storing a tab.

8. The microscope system of claim 1 further including a specimen tab for holding a specimen to be viewed.

9. The microscope system of claim 8 in which said specimen tab includes transparent sheets hingeably connected along one edge.

10. The microscope system of claim 1 further including a grid tab having a measured grid for indicating the dimensions of a specimen being viewed.

11. The microscope system of claim 10 in which the specimen being viewed is carried by said grid tab.

12. The microscope system of claim 10 in which the specimen being viewed is carried by a specimen tab.

13. The microscope system of claim 10 further including an aperture tab having at least one hole in it for reducing the optical aperture of said stage hole.

14. The microscope system of claim 1 further including a diffuser tab for diffusing the light illuminating a specimen through said stage hole.

15. The microscope system of claim 14 in which said diffuser tab includes a hole for highlighting a smaller area of the specimen than illuminated through said stage hole.

16. The microscope system of claim 1 further including a polarizer tab for polarizing light illuminating a specimen through said stage hole.

17. The microscope system of claim 1 further including at least one pocket in one of said lens and stage sections for storing a tab.

18. The microscope system of claim 17 in which said lens section is formed of two overlapping plates and a said pocket is formed between them.

19. The microscope system of claim 17 in which said lens section is formed of two overlapping plates each containing a lens hole and said lens is fastened over said lens holes between said plates.

20. The microscope system of claim 1 further including a gap in one of said pleats between said lens and stage sections for enabling direct interior viewing of said stage hole when said lens section is swung toward the collapsed condition.

21. The microscope system of claim 1 further including a slide including first and second transparent sheets hingeably connected along one edge.

22. The microscope system of claim 1 further including a well slide having a funnelled hole alignable with and nestable in said stage hole for holding a liquid specimen to be viewed.

23. The microscope system of claim 1 having at least one pair of cutouts on opposing sides of the longitudinal edge of said lens section for receiving rotatable wheels.

24. The microscope system of claim 1 further including a polarizing wheel having a polarizing element at its center aligned with said lens and rotatable about the axis of said lens for varying the direction of polarization.

25. The microscope system of claim 1 further including a first polarizing wheel having a first polarizing arcuate segment, said wheel being rotatably mounted to said lens section to move said segment past said lens and vary the direction of polarization.

26. The microscope system of claim 25 in which said polarizing wheel includes at the same radius as said segment a hole for unpolarized viewing.

27. The microscope system of claim 25 further including a second polarizing wheel having a second polarizing arcuate segment, said second wheel being rotatably mounted to said lens section to move said second segment past said lens and the first segment of said first polarizing wheel to vary polarization over 180°.

28. The microscope system of claim 1 further including a color wheel rotatable about an axis spaced from the axis of said lens and including at least one color filter radially spaced from the rotation axis of said color wheel for aligning a filter with said lens in one rotated position of said color wheel.

29. The microscope system of claim 1 further including an aperture wheel rotatable about an axis spaced from the axis of said lens and including at least one aperture smaller than that of said lens and radially spaced from the rotation axis of said aperture wheel for aligning an aperture with said lens in one rotated position of said aperture wheel.

30. The microscope system of claim 1 further including a reflective surface disposed on the inside of said lens section for reflecting light to the specimen at said stage section.

31. A hand-held collapsible microscope system comprising:
   a lens section for holding a lens;
   a stage section for holding a specimen to be viewed;
   a lens in said lens section and a stage hole in said stage section aligned with said lens when said system is erected;
   a pair of lateral slots in said stage section and spaced on either side of said stage hole for longitudinally holding a slide over said stage hole for viewing and storage;
   a channel extending laterally across said stage section for holding a slide tab over said stage hole; and
   first and second resilient pleated sections interconnecting the longitudinal edges of said lens section with the corresponding longitudinal edges of said stage section for enabling the sections to be erected with said lens and stage hole aligned and the distance between them to be adjustable for focussing by gentle pressure on said pleat and for enabling said sections to be swung to the collapsed position with the pleats extended and the sections flat on one another.

32. A blank for forming a hand-held collapsible microscope comprising:
   a stage section; first and second pleated sections; and a lens section with top and bottom plates;
   said first pleated section connected with said top plate along a first fold line and with said stage section along a second fold line, said first pleated section including a third fold line intermediate said first and second fold lines;
   said second pleated section being connected with said stage section along a fourth fold line and with said bottom plate along a fifth fold line; said second pleated section including a sixth fold line intermediate said fourth and fifth fold lines;
   said top and bottom plates including corresponding lens holes for acommodating a lens;

said stage section including a stage hole corresponding to said lens holes and a pair of slots in said stage section transverse to said fold lines and spaced on either side of said stage hole for receiving a slide; and a generally "U" shaped channel plate transversely cut in said first pleated section proximate said stage hole, with the two ends of the arms of said "U" shaped channel plate swingably connected along said second fold line for enabling said channel plate to be folded over said stage section in the area of said stage hole; said channel plate having a hole corresponding with said stage hole in the folded position.

33. The blank of claim 32 in which at least one of said plates includes a depressed area surrounding its lens hole for receiving said lens.

34. The blank of claim 32 further including a pair of wheel slots along said first and fifth fold lines proximate said lens holes for receiving a rotatable wheel.

35. The blank of claim 34 in which at least one of said wheel slots is crescent shaped.

36. The blank of claim 32 further including two pairs of wheel slots along said first and fifth fold lines on either side of said lens holes for mounting first and second wheels overlapping each other and said lens holes.

37. The blank of claim 32 further including at least one "U" shaped recess at one end of one of said top and bottom plates for forming a storage site for slide tabs between said plates.

38. A hand-held collapsible microscope system comprising:
a lens section for holding a lens;
a stage section for holding a specimen to be viewed;
a lens in said lens section and a stage hole in said stage section aligned with said lens when said system is erected;
means in said stage section for holding a specimen in registration with said stage hole including a channel extending laterally outside of said stage section for holding a slide tab over said stage hole, said channel surrounding and covering the area of said stage hole and including an aperture aligned with said stage hole and a channel plate fastened internally along two lateral paths to said stage section leaving a covered tab channel between said channel plate and said stage section; and
first and second resilient pleated sections interconnecting the longitudinal edges of said lens section with the corresponding longitudinal edges of said stage section for enabling the sections to be erected with said lens and stage hole aligned and the distance between them to be adjustable for focussing by gentle finger pressure on said pleat.

39. A hand-held collapsible microscope system comprising:
a lens section for holding a lens;
a stage section for holding a specimen to be viewed;
a lens in said lens section and a stage hole in said stage section aligned with said lens when said system is erected;
means in said stage section for holding a specimen in registration with said stage hole including a channel extending laterally outside of said stage section for holding a slide tab over said stage hole, said channel surrounding and covering the area of said stage hole and including an aperture aligned with said stage hole and a channel plate fastened externally through two lateral cutouts to said stage section leaving a covered tab channel between said paths and between said channel plate and said stage section; and
first and second resilient pleated sections interconnecting the longitudinal edges of said lens section with the corresponding longitudinal edges of said stage section for enabling the sections to be erected with said lens and stage hole aligned and the distance between them to be adjustable for focussing by gentle finger pressure on said pleat.

40. A hand-held collapsible microscope system comprising:
a lens section for holding a lens;
a stage section for holding a specimen to be viewed;
a lens in said lens section and a stage hole in said stage section aligned with said lens when said system is erected;
means in said stage section for holding a specimen in registration with said stage hole; and
first and second resilient pleated sections interconnecting the longitudinal edges of said lens section with the corresponding longitudinal edges of said stage section for enabling the sections to be erected with said lens and stage hole aligned and the distance between them to be adjustable for focussing by gentle finger pressure on said pleat, one of said pleats including a gap between said lens and stage sections for enabling direct interior viewing of said stage hole when said lens is swung toward the collapsed condition.

41. A hand-held collapsible microscope system comprising:
a lens section for holding a lens;
a stage section for holding a specimen to be viewed;
a lens in said lens section and a stage hole in said stage section aligned with said lens when said system is erected;
means in said stage section for holding a specimen in registration with said stage hole including a channel extending laterally across the outside of said stage section for holding a slide tab over said stage hole; and
first and second resilient pleated sections interconnecting the longitudinal edges of said lens section with the corresponding longitudinal edges of said stage section for enabling the sections to be erected with said lens and stage hole aligned and the distance between them to be adjustable for focussing by gentle finger pressure on said pleat, each pleat including at least one pair of spaced lateral slots for storing a tab.

42. A blank for forming a hand-held collapsible microscope comprising:
a stage section; first and second pleated sections; and
a lens section with top and bottom plates;
said first pleated section connected with said top plate along a first fold line and with said stage section along a second fold line, said first pleated section including a third fold line intermediate said first and second fold lines;
said second pleated section being connected with said stage section along a fourth fold line and with said bottom plate along a fifth fold line; said second pleated section including a sixth fold line intermediate said fourth and fifth fold lines;

said top and bottom plates including corresponding lens holes for accommodating a lens;

said stage section including a stage hole corresponding to said lens holes and a pair of slots in said stage section transverse to said fold lines and spaced on either side of said stage hole for receiving a slide; and at least one pair of spaced transverse slots in a pleated section for forming a storage site for slide tabs.

43. A hand-held collapsible microscope system comprising:

a lens section for holding a lens;

a stage section for holding a specimen to be viewed;

a lens in said lens section and a stage hole in said stage section aligned with said lens when said system is erected;

means in said stage section for holding a specimen in registration with said stage hole and a pair of lateral slots in said stage section and spaced on either side of said stage hole for longitudinally holding a slide over said stage hole for viewing and storage;

first and second resilient pleated sections interconnecting the longitudinal edges of said lens section with the corresponding longitudinal edges of said stage section for enabling the sections to be erected with said lens and stage hole aligned and the distance between them to be adjustable for focussing by gentle finger pressure on said pleat; and one of said pleats including a gap between said lens and said stage sections for enabling direct interior viewing of said stage hole when said lens section is swung toward the collapsed condition.

* * * * *